United States Patent
Matsuda et al.

(10) Patent No.: US 7,562,185 B2
(45) Date of Patent: *Jul. 14, 2009

(54) ACCESSING A STORAGE MEDIUM USING DYNAMIC READ STATISTICS

(75) Inventors: Hakuro Matsuda, Redmond, WA (US); John M. Harding, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 596 days.

This patent is subject to a terminal disclaimer.

(21) Appl. No.: 11/142,905

(22) Filed: Jun. 1, 2005

(65) Prior Publication Data

US 2006/0277358 A1    Dec. 7, 2006

(51) Int. Cl.
G06F 12/00 (2006.01)
G06F 3/00 (2006.01)
G06F 13/00 (2006.01)
G06F 5/00 (2006.01)

(52) U.S. Cl. .......................... 711/112; 711/4; 711/111; 711/167; 710/8; 710/10; 710/16; 710/18; 710/33; 710/34; 710/43; 710/58; 710/60

(58) Field of Classification Search ................ 711/112, 711/114, 4, 111, 167; 710/8, 10, 16, 18, 710/33, 34, 43, 58, 60

See application file for complete search history.

(56) References Cited

U.S. PATENT DOCUMENTS 5,463,758 A    10/1995    Ottesen
5,940,855 A    8/1999    Kayes et al.
6,272,598 B1    8/2001    Arlitt et al.
6,487,633 B1    11/2002    Horst et al.
7,366,833 B2    4/2008    Chanda et al.
7,383,400 B2    6/2008    Eng et al.
2004/0064640 A1*    4/2004    Dandrea et al. ............. 711/114
2005/0149667 A1    7/2005    Nakayama et al.

OTHER PUBLICATIONS

U.S. Appl. No. 11/166,337, filed Jun. 24, 2005, Matsuda et al.
CRI Middleware Products, CRI ADX Multi Stream Sound System, last accessed May 23, 2005 (3 pages) http://www.cri-mw.co.jp/products/product_adx_e.htm.
CRI Middleware, "Tell me about Middleware, Episode 2 What is Multi-Stream?," Copyright 2002, last accessed May 23, 2005 (5 pages) http://www.cri-mw.co.jp/comic/naze2e/page1_3e.htm.
U.S. Office Action Response filed Jun. 9, 2008 for U.S. Appl. No. 11/166,337.
U.S. Notice of Allowance dated Sep. 2, 2008 cited in U.S. Appl. No. 11/166,337.

* cited by examiner

*Primary Examiner*—Hyung S Sough
*Assistant Examiner*—Mehdi Namazi
(74) *Attorney, Agent, or Firm*—Perkins Coie LLP

(57) ABSTRACT

A method and system for accessing a storage medium that factors in read statistics of previous reads of the storage medium is provided. An access system tracks read statistics generated from previous attempts to read data of the storage medium, which may be stored on a per-unit basis. When the access system receives a request to read data of the storage device, the access system may generate a read plan for the read based on analysis of the read statistics. A read plan may specify the initial speed of the attempt to read the data. The access system uses the read statistics to help reduce the time needed to read a unit of data from the storage medium.

20 Claims, 9 Drawing Sheets

ACCESSING A STORAGE MEDIUM USING DYNAMIC READ STATISTICS

BACKGROUND

Storage media, such as DVD and CD-ROM, are used to store vast amounts of information that need to be accessed in real time by various applications such as computer game applications. A storage medium may contain data of various media types such as audio, video, text, and so on. The data of the various media types often need to be streamed to an application in real time so that the application can render the media in a time sensitive manner. For example, a video game may need to render the images of a scene at the same time as the sounds of the scene are rendered. To read the data, an application executing on a computing device may interface with a storage medium driver that in turn interfaces with a storage medium reading device (e.g., a DVD reader) to read the data of the storage medium. The application requests the storage medium driver to read data from a certain unit of data (e.g., file or sector) of the storage medium currently being accessed by (e.g., inserted into) the storage medium reading device. The storage medium driver directs the storage medium reading device to retrieve the data from the storage medium. After a successful read, the storage medium driver provides the read data to the application.

It can, however, be difficult for a storage medium reading device to read the data from a storage medium that is damaged, which can often occur as a result of user handling. Although a removable storage medium allows flexibility to access different storage media and to move the storage media from one device to another, the handling of the storage media by a person often results in damage, such as scratches, dirt, and so on, to the storage media. To help minimize the adverse effects of damage to storage media, developers use various techniques to help ensure that data can be read from a storage medium even though it is damaged in some way. For example, a storage medium driver may initially attempt to read a unit of the storage medium at a high speed. If the initial attempt to access a file fails, the storage medium driver may retry the attempt a few more times. If those attempts fail, the storage medium driver may attempt to read the unit at a lower speed which may result in a successful read of the unit. As another example of an attempt to minimize adverse effects of damage, the provider of a storage medium may store important files redundantly on the storage medium. For example, when the storage medium is a DVD, the provider may store an important unit on an outer track of the DVD and a copy of that important unit on an inner track of the DVD. In this way, if one of the copies of the unit is damaged, the storage medium driver can attempt to read the unit from the other copy.

These attempts to minimize the adverse effects of damage to a storage medium often result in the successful reading of data that would otherwise be unsuccessful. However, such attempts may take a considerable amount of time and result in the data being provided to the application in an untimely manner.

SUMMARY

A method and system for accessing a storage medium that factors in read statistics of previous reads of the storage medium is provided. An access system tracks read statistics generated from previous attempts to read data of the storage medium, which may be stored on a per-unit basis. When the access system receives a request to read data of the storage device, the access system may generate a read plan for the read based on analysis of the read statistics. A read plan may specify the initial speed of the attempt to read the data. The access system uses the read statistics to help reduce the time needed to read a unit of data from the storage medium.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
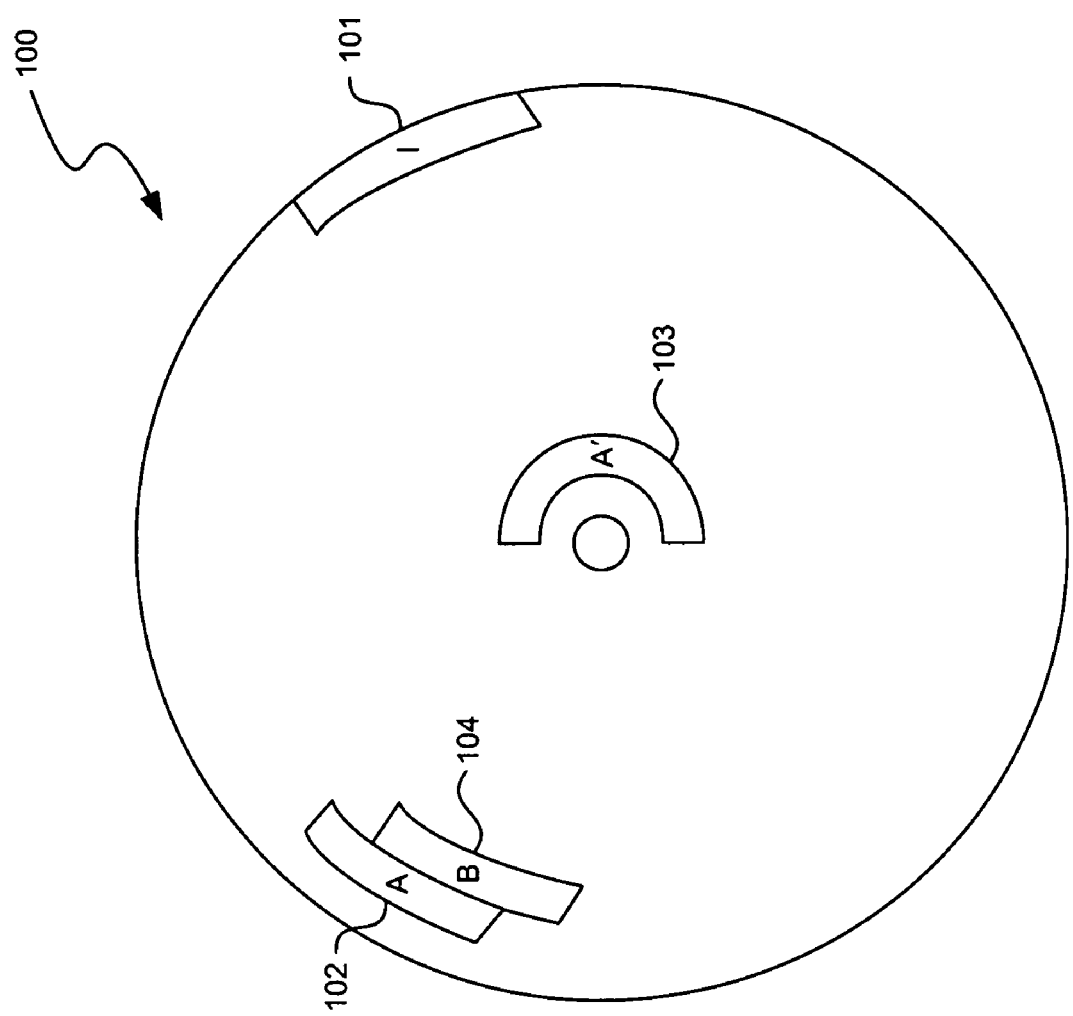
FIG. 1 is a diagram that illustrates the layout of a typical DVD storage medium.

A method and system for accessing a storage medium factoring in read statistics of previous reads of the storage medium is provided. In one embodiment, an access system tracks read statistics generated from previous attempts to read data of the storage medium, which may be stored on a per-unit (e.g., per-file or per-sector) basis. For example, when the access system reads data from the storage medium, the access system may record the speed at which the read was successful and the number of attempts needed for the successful read at that speed. When the access system receives a request to read data of the storage device, the access system may generate a read plan for the read based on analysis of the read statistics. A read plan may specify the initial speed of the attempt to read the data. For example, the read statistics may indicate that a unit was successfully read at a medium speed, but only after several unsuccessful attempts at that medium speed. In such a case, the read plan may indicate that the initial read speed should be slow in hopes that in the unit can be read after the first attempt, rather than making several attempts at a higher read speed. Alternatively, the read plan may indicate to make one attempt at reading the unit at a medium read speed and if unsuccessful, then start attempting to read the unit at a low read speed. In this way, the access system uses the read statistics to help reduce the time needed to read a unit of data (e.g., file or sector) from the storage medium.

In one embodiment, the access system may cache data read from a storage medium giving caching priority to important data that is difficult to read. If the access system has difficulty reading a unit of data, then it may be likely that the access system would have difficulty rereading that unit of data at a later time. In such a case, the access system may cache that unit of data so that it need not be reread from the storage medium. Since the size of a cache is typically relatively small compared to the size of the storage medium, only a small portion of the data of the storage media can be cached. As a result, the access system may cache units of data giving preference to units with a low readability score. A readability score attempts to estimate the ease at which a unit of data can be read based on the read statistics. For example, a readability score of 1.0 may indicate that the next read of the unit of data will likely be successful on the first attempt at a high speed, whereas a readability score of 0.2 may indicate that the next read will likely be successful on the third attempt at a low speed. When the cache is full, the access system may use a cache replacement policy that replaces the unit with the highest readability score with a newly read unit with a lower readability score. For example, if the cache contains five units with readability scores of 0.8, 0.8, 0.5, 0.2, and 0.1 and a new unit is read from the storage medium with a readability score of 0.4, then the replacement policy indicates to replace one of the units of data with a readability score of 0.8. After the replacement, the cache will contain five units with readability scores of 0.8, 0.5, 0.4, 0.2, and 0.1. The readability score may also factor in the importance of the information stored in the unit of data. For example, a unit of data that contains a background scene of a video game may be relatively unimportant compared to a unit of data that contains the image of the main character of the video game. In this way, the access system can cache important information that may be difficult to reread from the storage medium.

In one embodiment, the access system may not have previously read a unit of data of the storage medium and therefore may not have read statistics for that unit of data. (The access system may discard read statistics when a storage medium is removed from the storage medium reading device because a user may have removed the storage medium to repair the damage (e.g., clean the storage medium).) In such a case, the access system may generate a readability score for a unit based on read statistics for units stored nearby on the storage medium. If nearby units are damaged in some way, the likelihood of the unit being also damaged is high. For example, if the nearby units have a very low readability score, then the access system may develop a read plan that sets the initial read speed to low in hopes that the unit can be read on the first attempt. More generally, even if the access system has read statistics for a unit, it may calculate a readability score that factors in the readability of nearby units. For example, when a unit currently has a readability score of 1.0, but nearby units have a readability score of 0.1, the access system may develop a read plan assuming that the readability score of 1.0 may not be an accurate representation of the readability of that unit.

In one embodiment, the access system may set the start time for a read based on the read statistics. The start time indicates the time that the storage medium driver will request the storage medium reading device to start reading the unit. The access system sets the start time of the read to the needed time minus the projected read time. The read time is the time it takes to read a unit of data starting from the initial attempt. If the initial attempt at a high speed is successful, then the read time will be small. If, however, the access system performs several attempts at increasingly lower speeds, then the read time will be large. The access system may project a read time based on the readability score of the unit to be read. For example, a unit with a high readability score may have a small projected read time, whereas a unit of data with a low readability score may have a large projected read time. The access system will set the start time of the reads to factor in the projected read time. In this way, units with low readability scores would likely be available when needed.

FIG. 1 is a diagram that illustrates the layout of a typical DVD storage medium 100. The DVD includes a file index 101 that contains a mapping of the names of the files that are stored on the DVD to their locations. The index may identify the start sector of each file along with the number of sectors in the file. The DVD includes file A 102, file A' 103, and file B 104. File A and file A' are redundant copies of the same file. If one copy of the file is damaged, then the other copy may be accessible. File B is stored near file A. If read statistics are not available for file A, the access system may use read statistics associated with file B to develop a read plan for file A. If file B has a high readability score, then file A would likely have a high readability score. Similarly, if file B has a low readability score, then file A would also likely have a low readability score.

Figure 2:
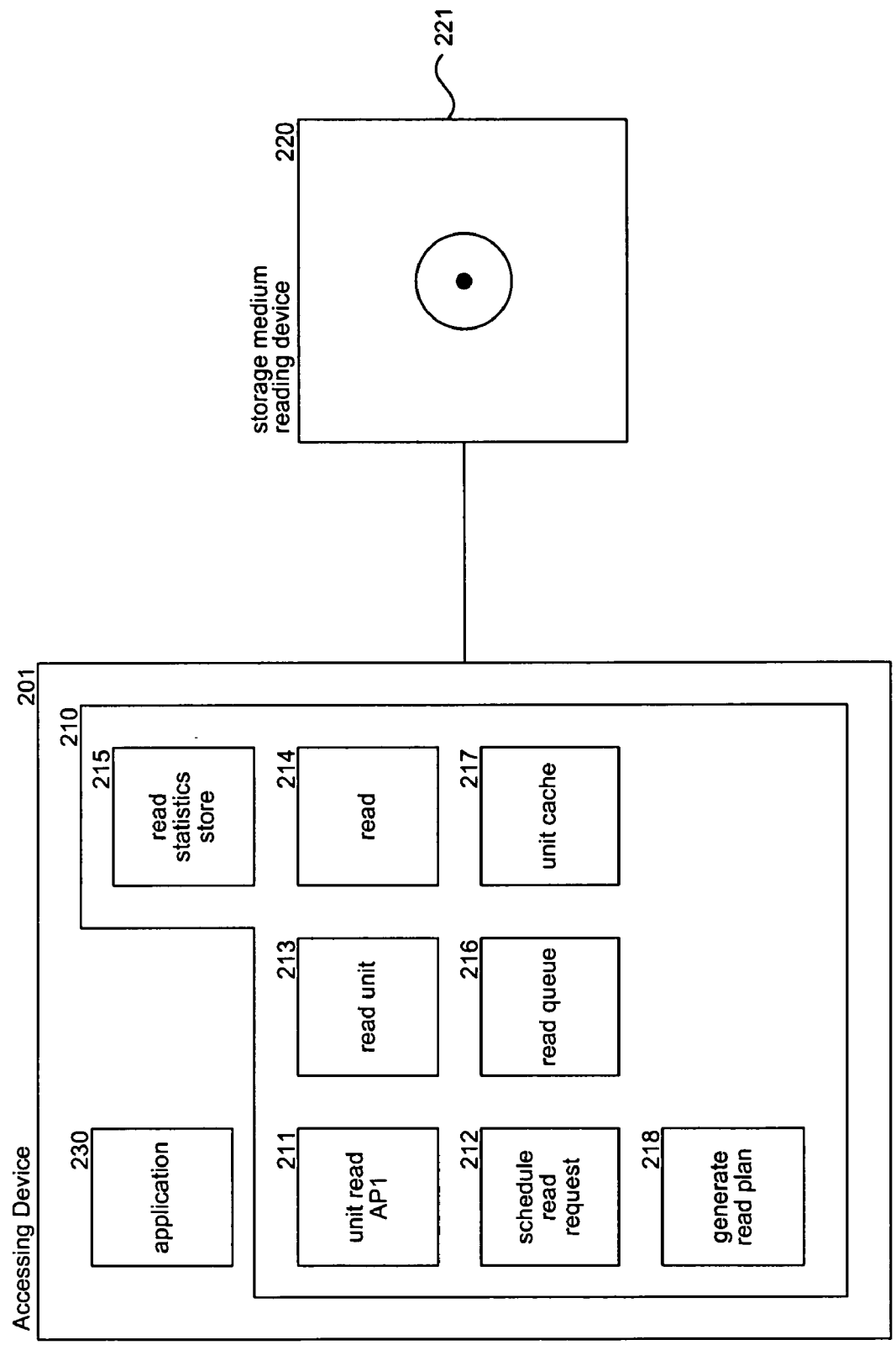
FIG. 2 is a block diagram that illustrates components of the access system in one embodiment.

FIG. 2 is a block diagram that illustrates components of the access system in one embodiment. Accessing device 201 includes an access system 210 and an application 230 (e.g., a video game). The accessing device is connected to a storage medium reading device 220, which is currently accessing storage medium 221. The access system includes a unit read API 211, a schedule read request component 212, a read unit component 213, a read component 214, and a generate read plan component 218. The application invokes the unit read API to submit read requests. The unit read API invokes the schedule read request component to schedule read requests. The schedule read request component places read requests in a read queue 216. The schedule read request component may invoke the generate read plan component to generate the read plan for accessing the unit. The read unit component retrieves read requests from the read queue and invokes the read component to control the reading of the unit from the storage medium. The read unit component stores read statistics from a read statistics store 215 and caches units in a unit cache 217. The schedule read request component develops a read plan based on the readability scores of the units as derived from the read statistics store.

The computing device on which the access system is implemented may include a central processing unit, memory, input devices (e.g., keyboard and pointing devices), output devices (e.g., display devices), and storage devices (e.g., disk drives). The memory and storage devices are computer-readable media that may contain instructions that implement the access system. In addition, the data structures and message structures may be stored or transmitted via a data transmission medium, such as a signal on a communications link.

Embodiments of the access system may be implemented in various operating environments that include video game consoles, personal computers, server computers, hand-held or laptop devices, multiprocessor systems, microprocessor-based systems, programmable consumer electronics, digital cameras, network PCs, minicomputers, mainframe computers, distributed computing environments that include any of the above systems or devices, and so on. A storage medium may be any medium whose read performance can degrade over time or whose read performance may vary based on unit location.

The access system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments. The component may also be implemented in any combination of hardware and software.

Figure 3:
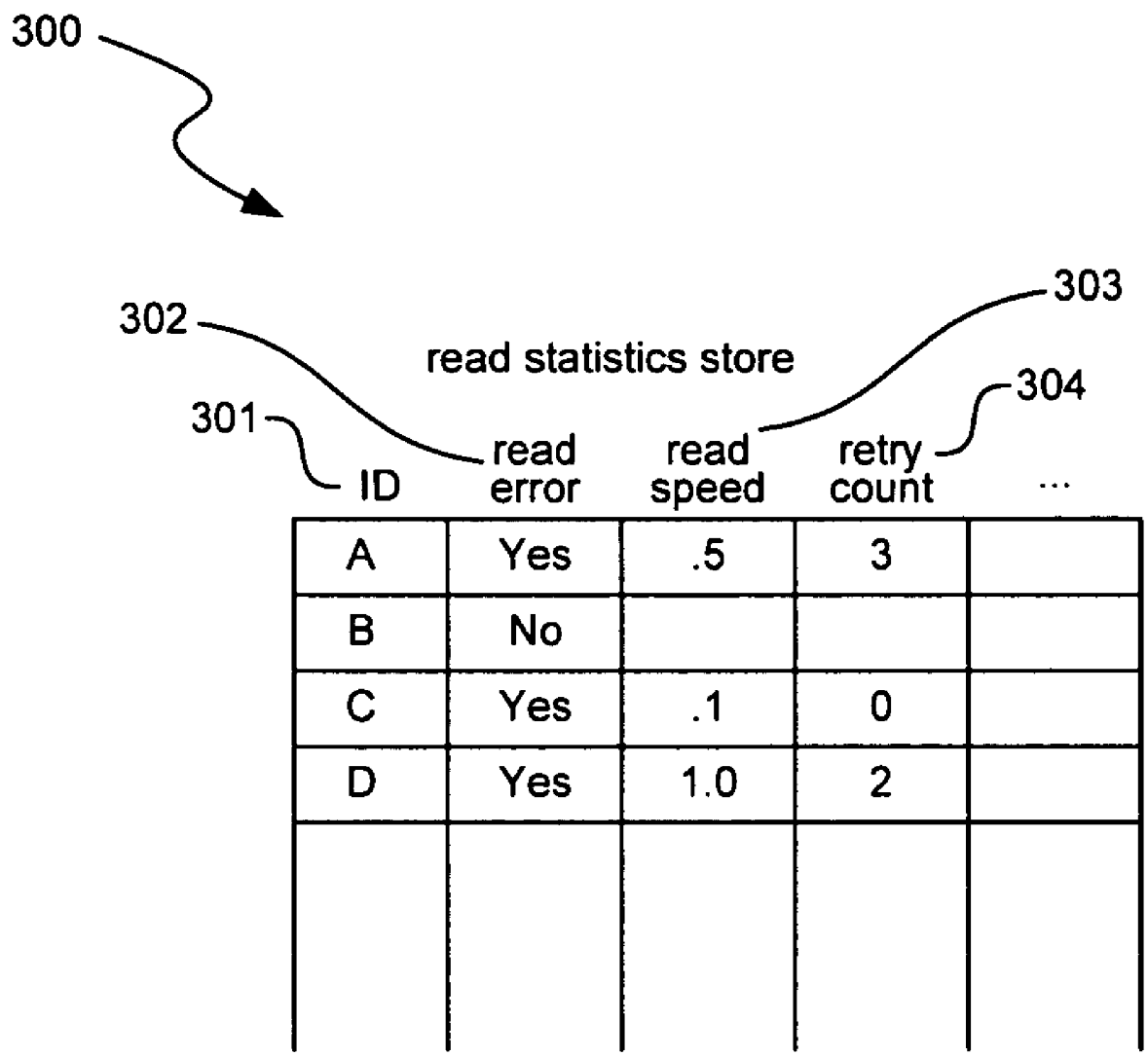
FIG. 3 is a diagram that illustrates sample data of the read statistics store in one embodiment.

FIG. 3 is a diagram that illustrates sample data of the read statistics store in one embodiment. A read statistics store 300 includes an entry for each unit of the currently inserted storage medium that the accessing device has attempted to read. Each entry includes an identification column 301, a read error column 302, a read speed column 303, a retry count column 304, and so on. The identification column contains the identification of the unit. The read error column indicates whether the last read of that unit was in error. The read speed column indicates the read speed of the last successful read of that unit. The retry count column indicates the number of retries that were attempted at the read speed. For example, the entry for unit A indicates that the last read was in error, that the unit was successfully read at the read speed of 0.5, and that it took three attempts at the read speed of 0.5 to successfully read unit A. The access system may also maintain a history of read attempts for each unit and develop a read plan based on that history. The access system may also collect other statistics such as frequency of read requests, time of read requests, and so on. These additional statistics may be used by the cache replacement policy or to schedule speculative read requests. The access system may initialize the read statistics store each time a storage medium is inserted into the storage medium reading device.

Figure 4:
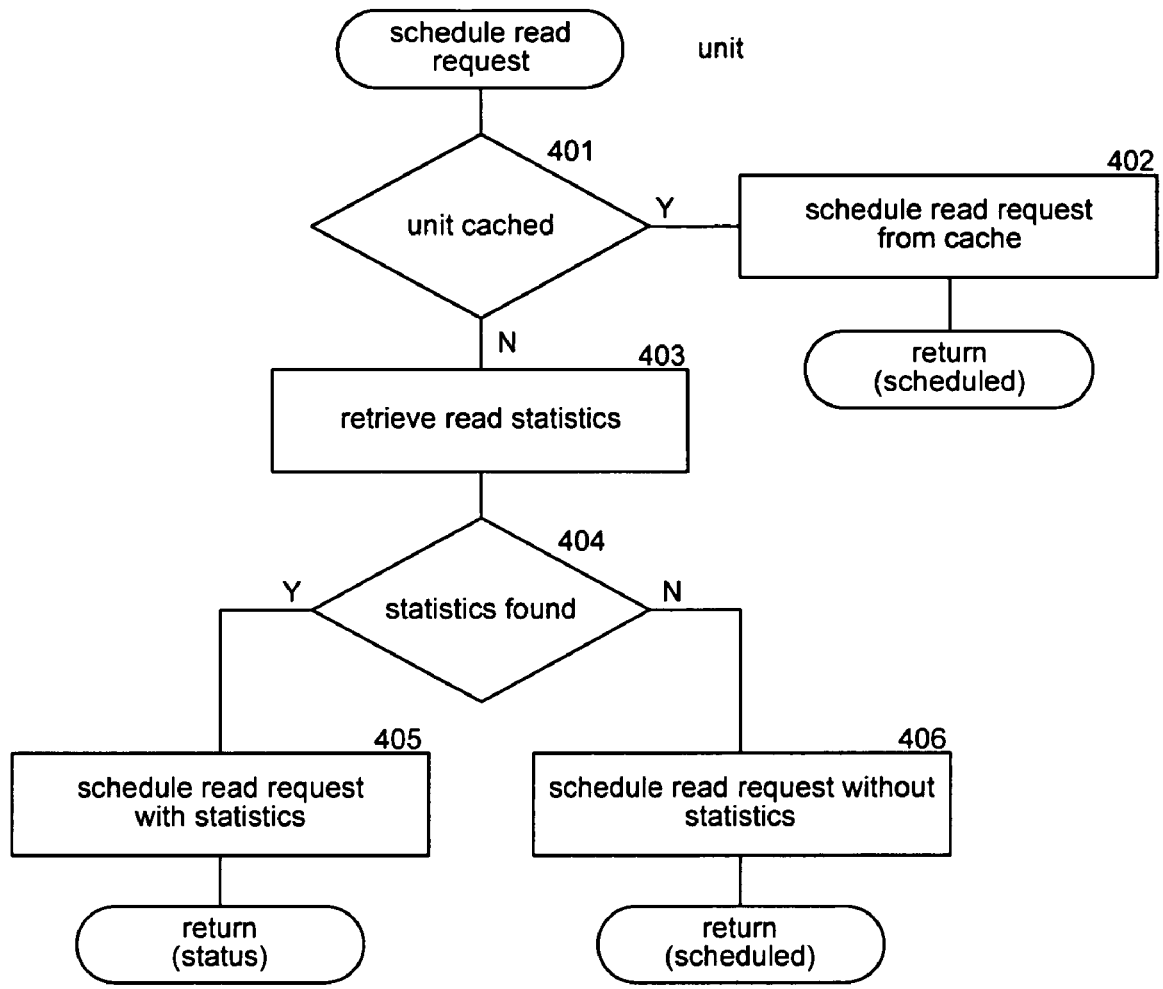
FIG. 4 is a flow diagram that illustrates the processing of the schedule read request component in one embodiment.

FIG. 4 is a flow diagram that illustrates the processing of the schedule read request component in one embodiment. The component is invoked to schedule a read request for a unit. The component first checks the cache to determine whether the read request can be satisfied from the cache. If not, the component retrieves the read statistics and schedules the read request factoring in the read statistics. In decision block 401, if the unit is cached, then the component continues at block 402, else the component continues at block 403. In block 402, the component schedules the read request to be from the cache and returns an indication that the read request has been scheduled. The component schedules a read request by adding it to the read queue. In block 403, the component retrieves the read statistics for the unit to be read. In decision block 404, if the read statistics for the unit are found, then the component continues at block 405, else the component continues at block 406. In block 405, the component invokes a schedule read request with statistics component to schedule the read request and then returns the status returned by the invoked component. In block 406, the component schedules the read request and returns an indication that it is scheduled.

Figure 5:
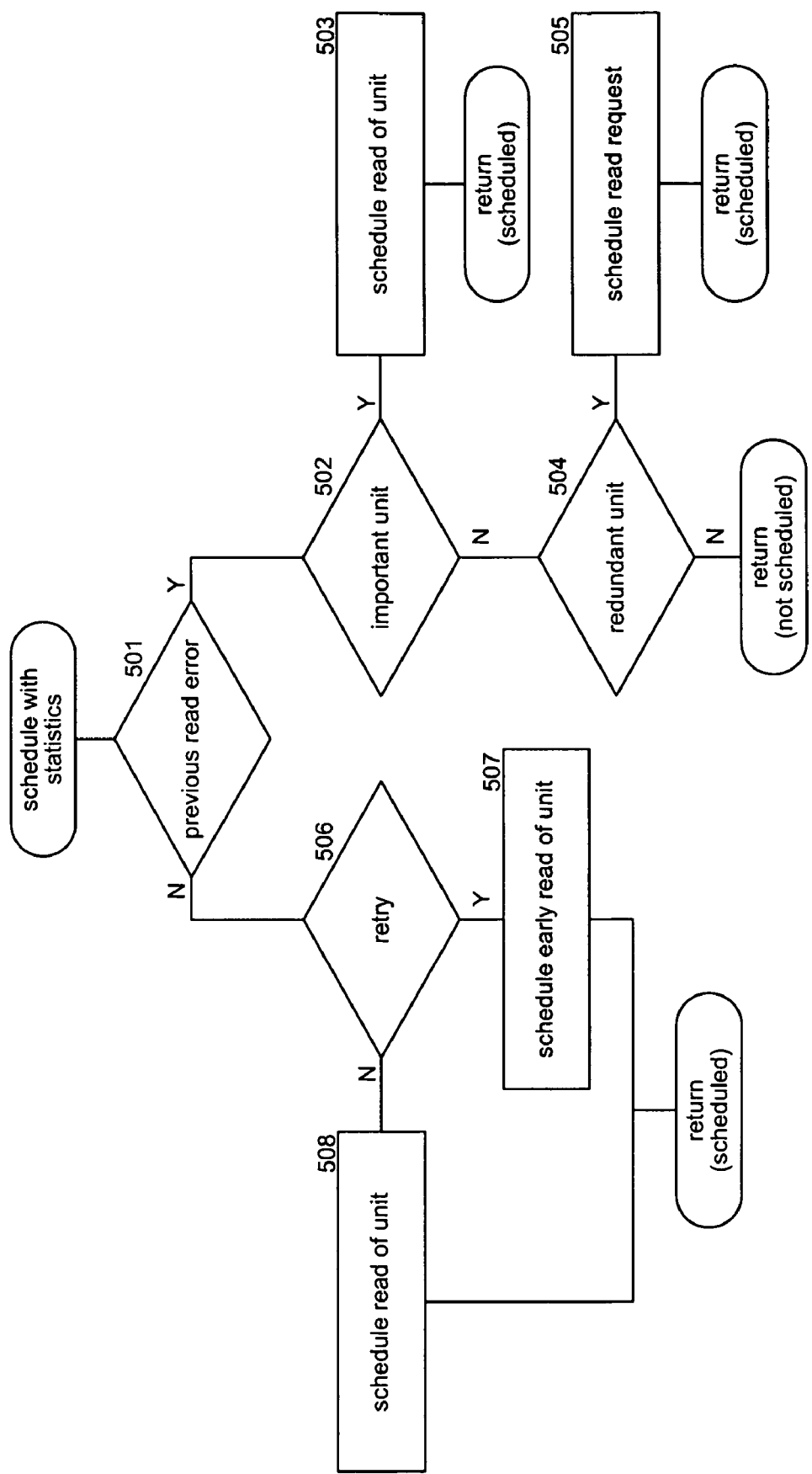
FIG. 5 is a flow diagram that illustrates the processing of the schedule read request with statistics component in one embodiment.

FIG. 5 is a flow diagram that illustrates the processing of the schedule read request with statistics component in one embodiment. The component bases the read plan on file importance, the availability of a redundant unit, and the number of previous retry attempts. In decision block 501, if the unit was not previously read because of an error, then the component continues at block 502, else the component continues at block 506. In decision block 502, if the unit contains important information, then the component continues at block 503, else the component continues at block 504. In block 503, the component schedules the read request of the important unit and returns an indication that the read request has been scheduled. In decision block 504, if the unit has a redundant copy, then the component continues at block 505, else the component returns an indication that the read request was not scheduled. In block 505, the component schedules the read request and then returns an indication that the read request has been scheduled. In decision block 506, if the previous read was not successful on the first attempt, then the component continues at block 507, else the component continues at block 508. In block 507, the component schedules the read request with an early start time and then returns an indication that the request has been scheduled. In block 508, the component schedules the read of the unit at a normal start time and then returns an indication that the read request has been scheduled. Although not shown in FIG. 5, the component may also determine an initial read speed as part of the read plan.

Figure 6:
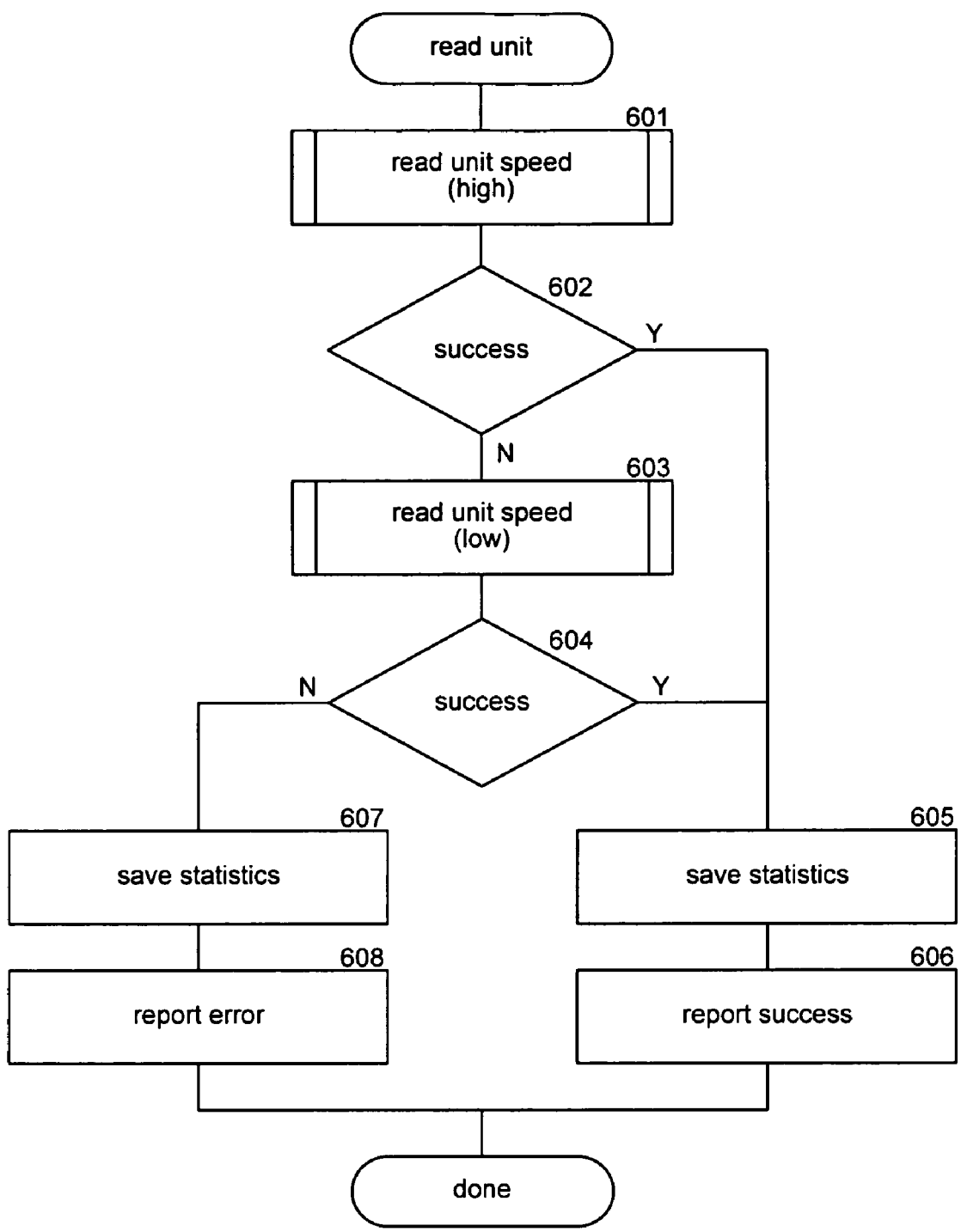
FIG. 6 is a flow diagram that illustrates the processing of the read unit component in one embodiment.

FIG. 6 is a flow diagram that illustrates the processing of the read unit component in one embodiment. The component attempts to read the unit at a high speed and, if unsuccessful, attempts to read the unit at a low speed. In block 601, the component invokes a read unit at speed component passing an indication of a high speed. In decision block 602, if the read at the high speed was successful, then the component continues at block 605, else the component continues at block 603. In block 603, the component invokes the read unit at speed component passing an indication of a low speed. In decision block 604, if the read was successful at the low speed, then the component continues at block 605, else the component continues at block 607. In block 605, the component stores the read statistics of the successful read in the read statistics store. In block 606, the component reports the success of the read and then completes. In block 607, the component stores the read statistics of the unsuccessful read in the read statistics store. In block 608, the component reports the unsuccessful read and then completes.

Figure 7:
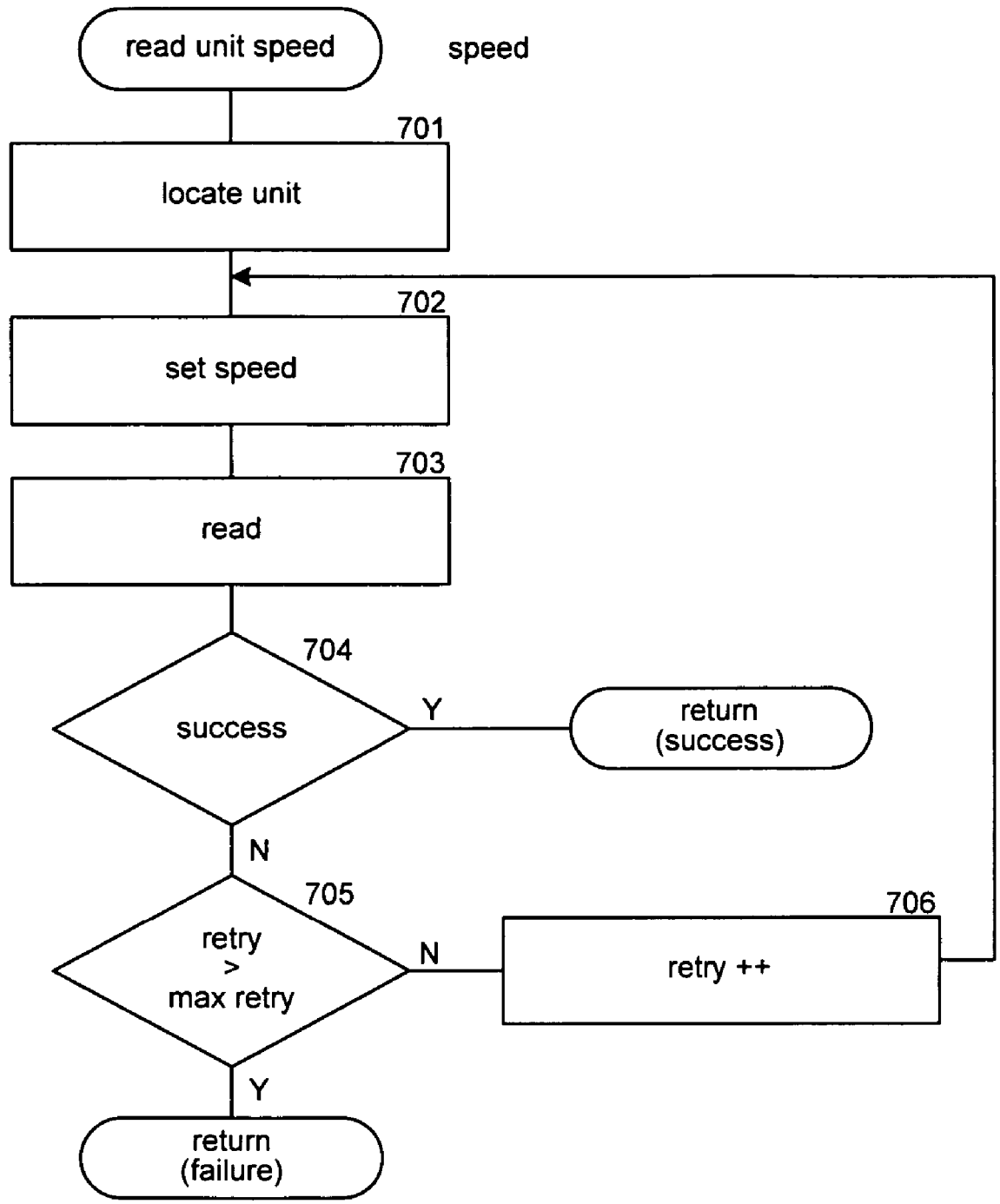
FIG. 7 is a flow diagram that illustrates the processing of the read unit at speed component in one embodiment.

FIG. 7 is a flow diagram that illustrates the processing of the read unit at speed component in one embodiment. The component is passed an indication of the speed at which the unit is to be read. The component may make several attempts at reading the unit at the speed. In block 701, the component locates the unit. For example, if the unit is a file, then the component may access the index to identify the start sector of the file. In blocks 702-706, the component loops attempting to read the unit. In block 702, the component sets the speed to the passed speed. In block 703, the component attempts to read the unit at the set speed. In decision block 704, if the read was successful, then the component returns an indication of success, else the component continues at block 705. In decision block 705, if the current count of the retries is greater than the maximum number of retries allowed, then the component returns an indication of failure, else the component increments the retry count in block 706 and loops to block 702 to retry reading the unit.

Figure 8:
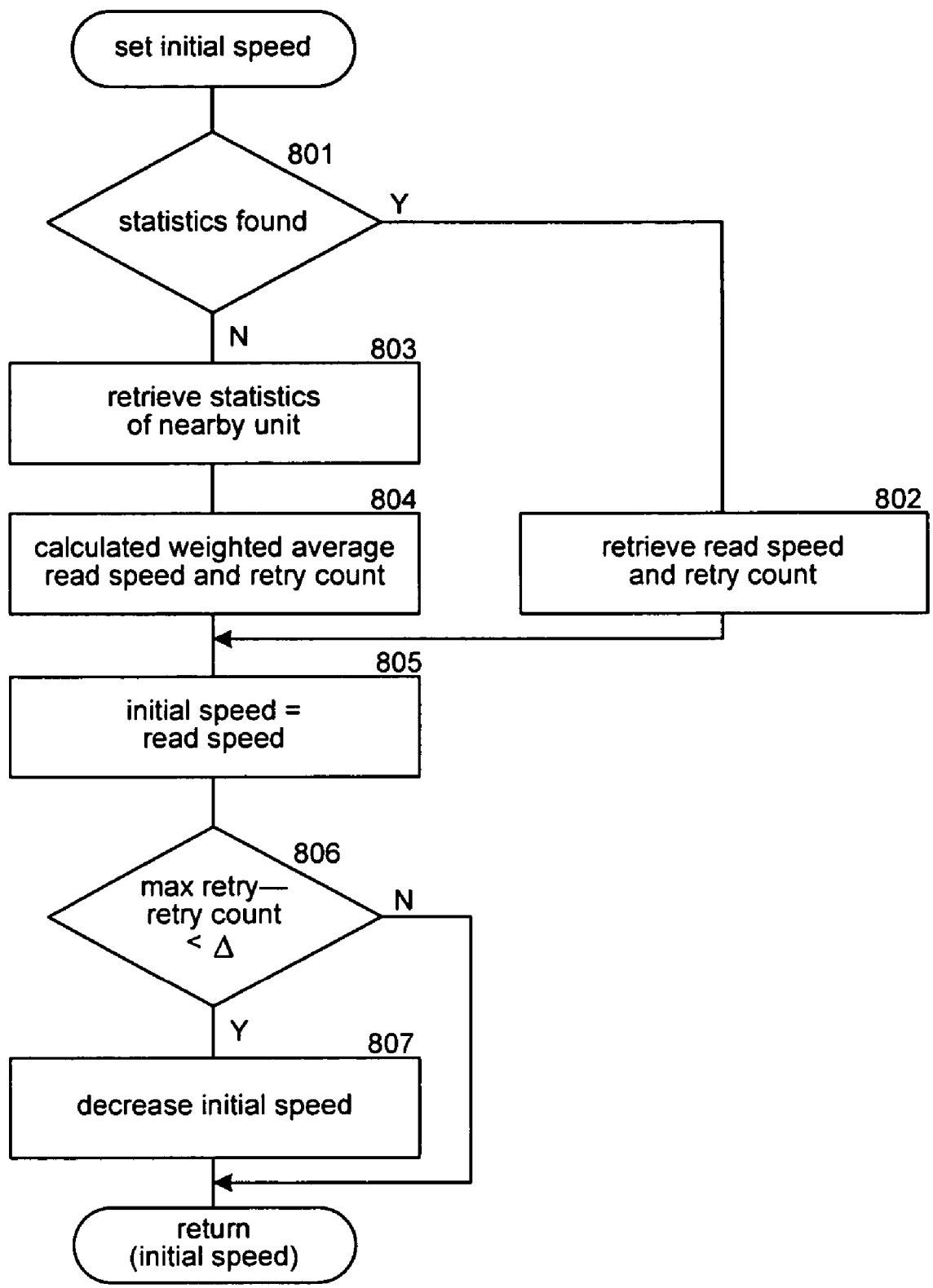
FIG. 8 is a flow diagram that illustrates the processing of a component to set the initial read speed.

FIG. 8 is a flow diagram that illustrates the processing of a component to set the initial read speed. If the read statistics indicate that the unit is likely not readable at a high speed, then the component will set the initial speed to a low speed. In decision block 801, if read statistics are found for the unit to be read, then the component continues at block 802, else the component continues at block 803. In block 802, the component retrieves the read speed and retry count for the unit and continues at block 805. In block 803, the component retrieves the read statistics for units near the unit to be read. In block 804, the component calculates weighted averages of the read speed and retry count for the nearby units. The weighted averages may factor in the distance between the unit to be read and the nearby units. In block 805, the component sets the initial speed to the read speed of the read statistics of the unit or to the average read speed of nearby units. In decision block 806, if the retry count is close to the maximum retry count, then the component continues at block 807, else the component returns an indication of the initial speed. If the retry count is close to the maximum retry count, then the component may decide to decrease the initial speed to increase the chances that the first attempt to read the unit may be successful. In block 807, the component decreases the initial speed and returns an indication of the initial speed.

Figure 9:
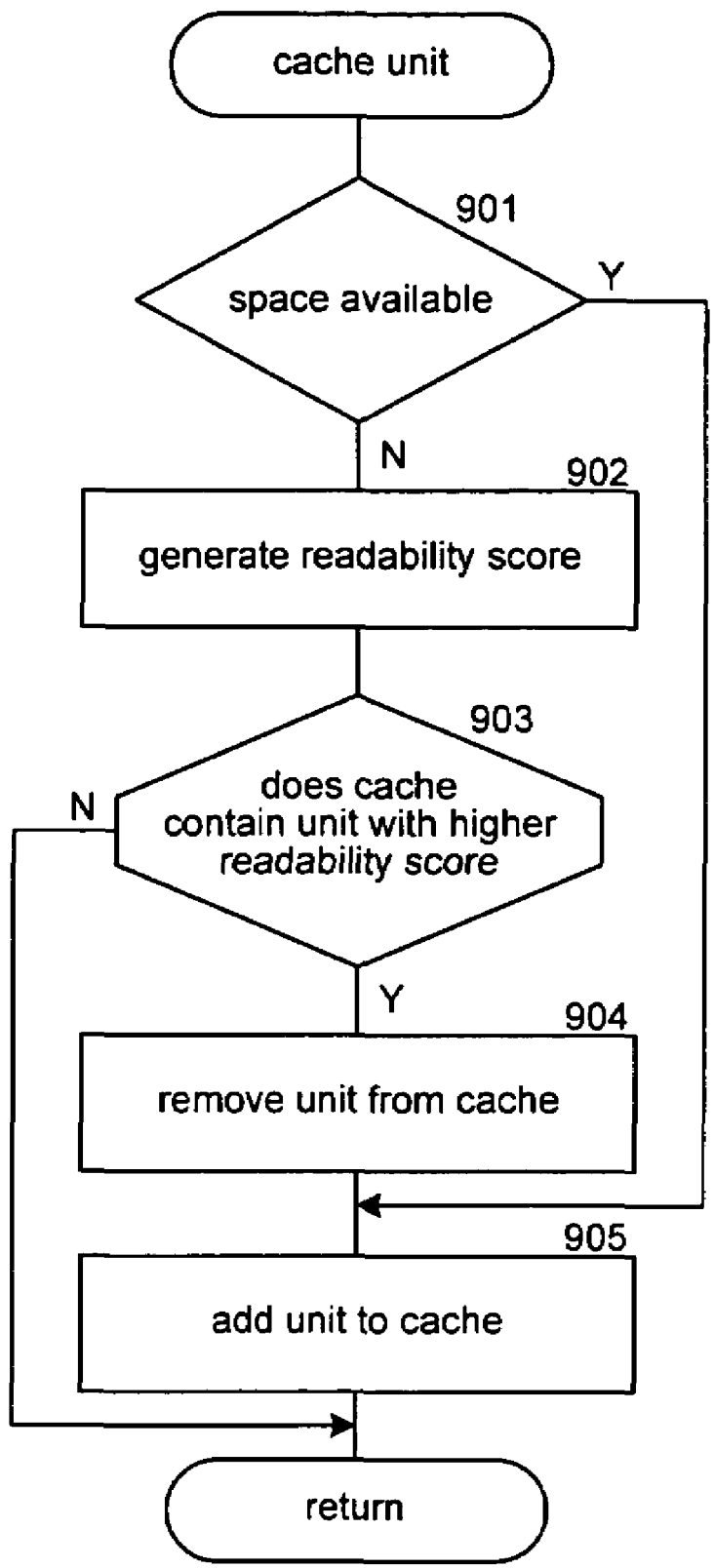
FIG. 9 is a flow diagram that illustrates the processing of a component that implements a cache replacement policy in one embodiment.

FIG. 9 is a flow diagram that illustrates the processing of a component that implements a cache replacement policy in one embodiment. This component implements a cache replacement policy in which the unit with the highest readability score is removed from the cache. In decision block 901, if there is space available in the cache, then the component continues at block 905, else the component continues at block 902. In block 902, the component generates a readability score for the unit that was just successfully read. In decision block 903, if the cache contains a unit with a higher readability score, then the component continues at block 904, else the component returns without caching the unit. In block 904, the component removes the unit with the highest readability score from the cache. In block 905, the component adds the newly read unit to the cache and then returns.

From the foregoing, it will be appreciated that specific embodiments of the access system have been described herein for purposes of illustration, but that various modifications may be made without deviating from the spirit and scope of the invention. One skilled in the art will appreciate that various components of the access system can be used independently of or in combination with other components. For example, the cache replacement algorithm may be used in an environment where no read plan is developed. Accordingly, the invention is not limited except as by the appended claims.

We claim:

1. A method in a device for accessing a storage medium, the method comprising:
   receiving a request to retrieve a unit of data from the storage medium;
   providing read statistics generated from previous attempts to access the same unit of data from the storage medium, the read statistics generated from attempts to read units of data of the storage medium when servicing read requests, the read statistics being tracked on a per-unit of data basis, the read statistics for a unit of data indicating, for each of a plurality of attempted reads to service a read request for the unit of data, a read speed of the attempted read and whether the attempted read was successful;
   generating a read plan for the unit of data based on the provided read statistics, the read plan indicating a number of attempts at each of a plurality of read speeds; and
   attempting to read the data using the generated read plan by attempting to read the unit of data at each read speed of the read plan for the indicated number of attempts starting with the fastest read speed until an attempt is successful.

2. The method of claim 1 wherein the storage medium is a disc storage medium.

3. The method of claim 1 including caching data based on readability of the unit of data.

4. The method of claim 3 wherein the caching is further based on importance of the unit of data.

5. The method of claim 1 wherein the read statistics indicate whether a previous read attempt was successful and if successful indicate readability of the unit of data.

6. The method of claim 5 wherein the read statistics indicate speed of a successful read.

7. The method of claim 6 wherein the read statistics indicate number of retries at the successful read speed.

8. The method of claim 1 wherein the generating of the read plan factors in read statistics of a unit of data stored nearby on the storage medium.

9. The method of claim 1 wherein the read plan sets a start read time that is based on readability of the unit of data.

10. The method of claim 1 wherein the storage medium is inserted into a read device and including resetting the read statistics when a storage medium is inserted into the read device.

11. A computer-readable storage device containing instructions for controlling a device to read a disc storage medium, by a method comprising:
    for each read of a unit of data from the disc storage medium, storing read statistics on the reading of the unit of data, the read statistics generated from attempts to read the unit of data from the disc storage medium when servicing read requests, the read statistics being tracked on a per-unit of data basis, the read statistics for a unit of data indicating, for each of a plurality of attempted reads to service a read request for the unit of data, a read speed of the attempted read and whether the attempted read was successful;
    receiving a request to read a unit of data; and
    attempting to read the unit of data at an initial speed that is derived from the read statistics for the unit of data.

12. The computer-readable storage device of claim 11 including caching a unit of data based on readability of the unit of data.

13. The computer-readable storage device of claim 12 wherein the caching is further based on importance of the data of the unit of data.

14. The computer-readable storage device of claim 11 wherein the read statistics indicate number of retries at the successful read speed.

15. The computer-readable storage device of claim 11 wherein the initial read speed factors in read statistics of units of data stored nearby on the disc storage medium.

16. The computer-readable storage device of claim 11 wherein the attempt to read the unit of data is started at a time based on readability of the unit of data.

17. A computer-readable storage device containing instructions for controlling a device to generate a read plan for a storage disc, by a method comprising:
    providing read statistics on the reading of units of data, the read statistics including speed of a successful read of the unit of data, the read statistics generated from attempts to read units of data of the storage disc when servicing read requests, the read statistics being tracked on a per-unit of data basis, the read statistics for a unit of data indicating, for each of a plurality of attempted reads to service a read request for the unit of data, a read speed of the attempted read and whether the attempted read was successful; and
    creating a read plan for a unit of data that establishes an initial read speed and a number of attempts at the initial read speed for the unit of data based on the provided read statistics, the number of attempts indicating the number of unsuccessful attempts at the initial read speed before attempting to read the unit of data at a lower read speed.

18. The computer-readable storage device of claim 17 wherein the provided read statistics include number of retries at the successful read speed and wherein the initial read speed factors in the number of retries.

19. The computer-readable storage device of claim 17 wherein the initial read speed factors in read statistics of nearby units of data.

20. The computer-readable storage device of claim 17 wherein a unit of data is selected from the group consisting of a sector and a file.

* * * * *